April 15, 1952     W. J. F. FORWARD ET AL     2,592,799
VARIABLE-SPEED TRANSMISSION
Filed Feb. 7, 1947     4 Sheets-Sheet 2
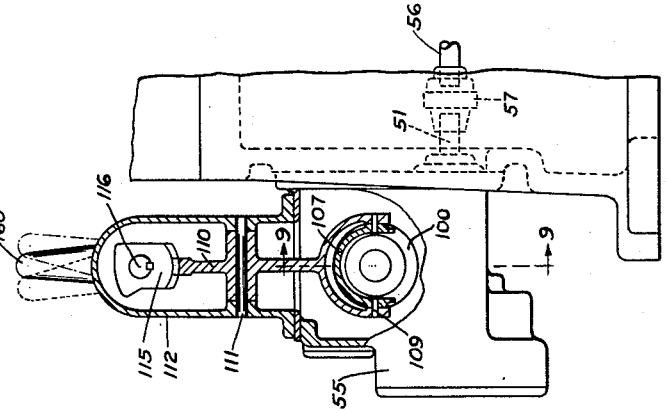
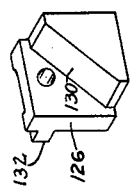
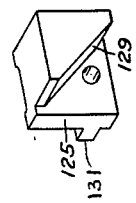
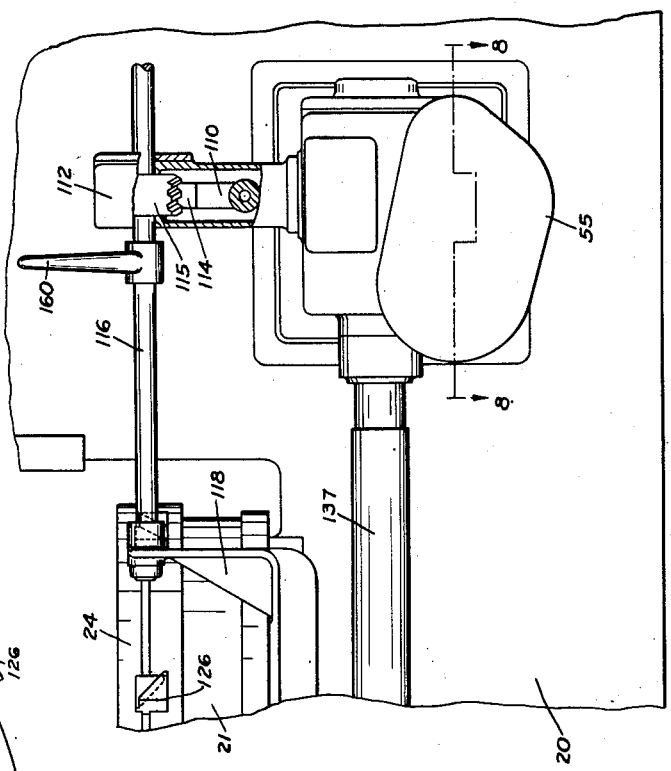
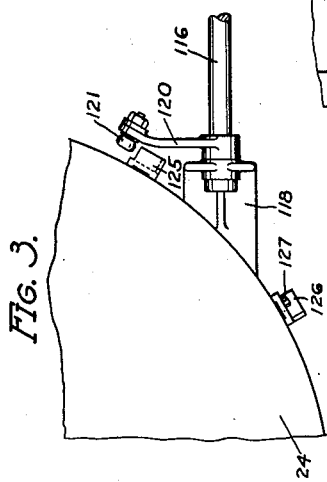
INVENTORS
WORTHY J.F. FORWARD
P. RUSSELL ROBERTS
BY
ATTORNEY April 15, 1952  W. J. F. FORWARD ET AL  2,592,799
VARIABLE-SPEED TRANSMISSION Filed Feb. 7, 1947  4 Sheets-Sheet 3

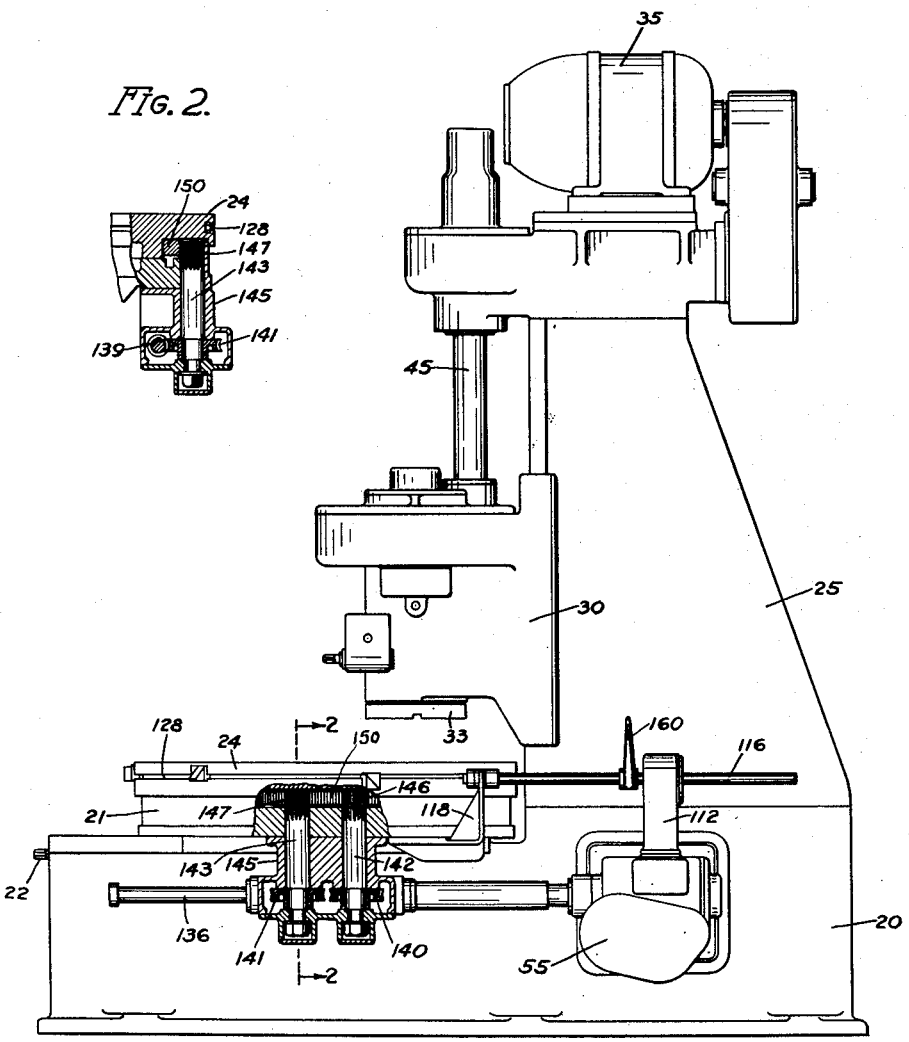

INVENTORS
WORTHY J. F. FORWARD
BY R. RUSSELL ROBERTS

ATTORNEY

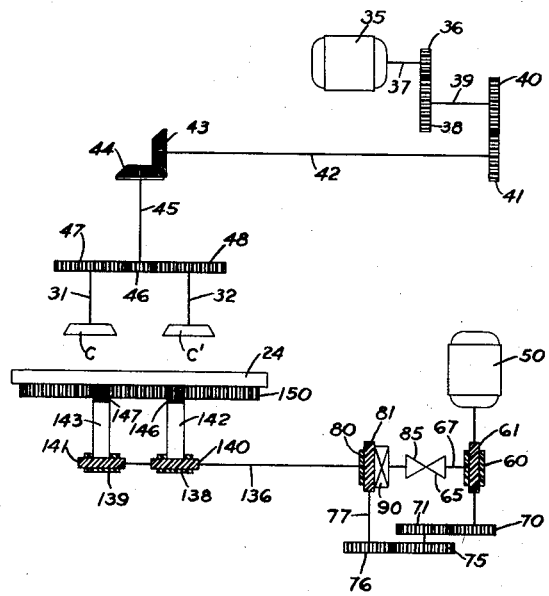
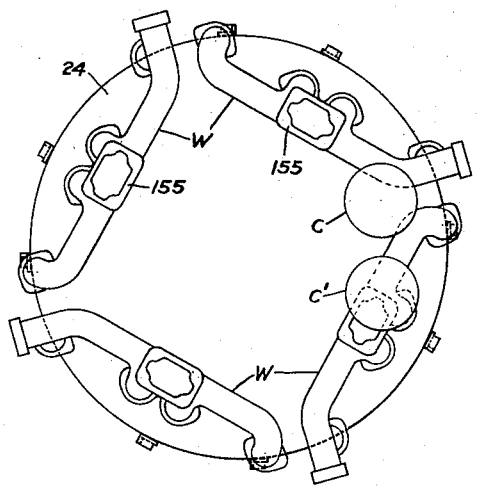

Patented Apr. 15, 1952

2,592,799

UNITED STATES PATENT OFFICE 2,592,799

VARIABLE-SPEED TRANSMISSION

Worthy J. F. Forward, Rochester, and Roland R. Roberts, Irondequoit, N. Y., assignors to Consolidated Machine Tool Corporation, Rochester, N. Y., a corporation of Delaware Application February 7, 1947, Serial No. 726,990

4 Claims. (Cl. 74—368)

The present invention relates to drives which operate alternately at high speed and low speed. More specifically the invention relates to mechanism for use in machine tools for producing intermittent slow-feed and rapid-traverse of the work relative to the tool.

When a milling machine, for instance, is set-up to mill successively a plurality of work pieces that are clamped in angularly spaced relation around the rotary work table of the machine, and the work pieces are comparatively large while the surfaces that are to be milled on them are comparatively small, it is desirable to traverse the relatively great distances between successive cuts as rapidly as possible, in order to reduce to a minimum the idle, non-working time of the machine. For this reason, it is common practice to provide continuous-type milling machines with a work table drive which will rotate the table alternately at high and low speeds, the low speed drive being operative during actual milling, when the surface that is to be milled is being fed under the cutter, and the high speed drive being operative between cuts, the low speed drive being resumed each time just before the cutter reaches the next surface to be milled. Similar drives are desirable and may be provided on straight line milling machines, planers, and other types of machine tools, where the work set-up requires a plurality of spaced work-operations.

The intermittent slow-feed and rapid-traverse drives heretofore built have had several serious drawbacks. The two sets of reduction gearing, which are required to produce the slow speed and high speed drives, respectively, are engaged and disengaged, alternately by a shifting clutch. The shifting movements of the clutch alternately in opposite directions is initiated by trip dogs mounted on the work table or other part of the machine which is to be driven alternately at low and high speeds. The momentum of the movable part is not enough, however, after disengagement of one drive, particularly the slow speed drive, to insure completion of the shifting movement of the clutch, and engagement of the other drive. For this reason it is the practice in mechanisms of this character heretofore built to provide a load and fire mechanism for carrying the clutch on to completion of its shifting movements in both directions. The result is that the clutch always engages with a shock. This may affect the quality of the work; it causes rapid wear of the parts; and results in noise and high maintenance costs. As a consequence in prior mechanisms of the character described it has been necessary to operate the machine at a speed in rapid traverse, which is less than might otherwise be attained, in order to reduce as far as possible the shock of engagement of the low speed drive. Moreover, because of the use of a load and fire mechanism for shifting, it has heretofore been impractical to shift manually from low speed to rapid traverse, and vice versa, as is desirable in setting up a machine.

One object of the present invention is to provide an intermittent slow-feed and rapid-traverse mechanism in which engagement of both high speed and low speed drives is shockless.

Further objects of the invention are to provide a mechanism of the character described in which wear is reduced to a minimum, and which will be extremely quiet in operation.

Another object of the invention is to provide a mechanism of the character described with which precise, controlled engagement of both the fast and slow speed drives is obtained. Thus, full advantage may be taken of the rapid traverse, to secure maximum production from the machine on which the mechanism is used.

Still another object of the invention is to provide a mechanism of the character described in which for set-up purposes the shift from slow feed to rapid traverse and vice versa may be made instantaneously by means of a conveniently located hand lever.

Other objects of the invention will be apparent hereinafter from the specification and from the recital of the appended claims.

The invention has been illustrated in the accompanying drawings as applied to a vertical spindle type continuous milling machine, but it will be understood that it has wide application.

In these drawings:

Fig. 1 is a side elevational view of a vertical spindle type continuous milling machine in which the rotary work table is driven by an intermittent slow speed and fast traverse mechanism constructed according to one embodiment of this invention, parts being broken away to show the table drive;

Fig. 2 is a fragmentary sectional view through the table drive, taken on the line 2—2 of Fig. 1;

Fig. 3 is a fragmentary plan view on a somewhat enlarged scale showing the mechanism for tripping the intermittent slow and high speed drives;

Figs. 4 and 5 are isometric views on an enlarged scale, showing the two kinds of trip dogs employed on the machine;

Fig. 6 is a fragmentary side elevational view, with parts broken away and on an enlarged scale, showing further details of the trip mechanism, and showing the box which houses the low speed and high speed drives;

Fig. 7 is a fragmentary view at right angles to Fig. 6, parts being broken away to show details of the shift mechanism;

Fig. 11 is a drive diagram of the machine; and

Fig. 12 is a more or less diagrammatic plan view showing a typical work table set-up for milling surfaces of exhaust manifolds of an automobile, and illustrating the purpose of the intermittent rotary table drive.

Figure 10:
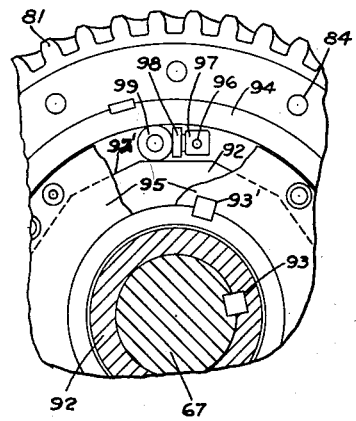
Fig. 10 is a fragmentary sectional view on an enlarged scale showing a detail of the over-running clutch.

In the machine illustrated, the table is adapted to be driven during cutting at slow speed by one set of reduction gears and between cuts at high speed by another set of reduction gears. Both sets of reduction gears rotate continuously as long as the machine is in operation. Two disc clutches are provided to connect the driven members of these two sets of reduction gearing alternately with the table drive shaft to drive the table alternately at low and high speeds. For alternately engaging these disc clutches, an actuating member is provided, that is mounted on the table drive shaft for axial shifting movement. The axially shiftable member is tripped by trip dogs mounted on the table itself, which are so constructed as to move the shift member alternately in opposite directions as the table rotates.

In addition to the two disc clutches, there is an overrunning clutch provided. This is mounted between the table drive shaft and the driven member of the low speed reduction, and is adapted to connect the driven member of this reduction to the table drive shaft. When the high-speed reduction is driving, this over-running clutch idles, but as soon as the disc clutch on the high-speed side is disengaged, the low speed reduction gearing tends to drive through the over-running clutch. Ordinarily, however, the momentum of the table drive shaft, after disconnection of the high-speed drive is sufficient to continue to drive the shaft until the disc clutch on the low-speed side is engaged. In fact, the engagement of the disc clutch on the low-speed side is usually required to prevent the table drive shaft from coasting too far at high speed and carrying the work at high speed into the cutter. The disc clutch on the low-speed side brakes the drive shaft and insures precise, controlled drive at low speed from just before engagement of the cutter with the work through the ensuing cutting operation. When the cut has been completed, the low speed clutch is disengaged. The over-running clutch then becomes operative, and the drive continues through it until the fast speed clutch has again been engaged. Thus the table drive is maintained during shift of the axially shiftable disc clutch actuating member, and need for any load and fire mechanism is completely eliminated. Shock and noise are obviated.

Referring now to the drawings by numerals of reference, 20 denotes the bed or frame of a vertical type continuous milling machine constructed according to this invention. Mounted on the bed 20 to be adjustable rectilinearly thereon is a slide 21. This may be adjusted on the bed 20 by rotation of a screw shaft 22 which is journaled in the bed and which enages in a nut (not shown) that is secured to the slide. Rotatably mounted on the slide 21 is a work table 24 that is adapted to rotate on a vertical axis.

Mounted on the bed 20 and rigidly secured thereto is a column or upright 25. Mounted on the front face of this column for rectilinear adjustment thereon is a milling cutter head 30. Vertical adjustment of this head to bring the cutter or cutters, that are mounted thereon, toward or away from operative relation with the work, may be effected in any suitable manner. The invention has been shown in the drawings as applied to a machine having two cutter spindles, but it will be understood that the number of cutter spindles has no bearing on the invention and it may be employed on a single spindle machine or on a multi-spindle machine. When two cutter spindles are employed, one of the cutters may be employed for rough-milling the work, and the other cutter for finish-milling the work.

In the drive diagram of Fig. 11, the two cutter spindles are denoted at 31 and 32, respectively. The head 33 of one of these spindles is shown in Fig. 1. The milling cutter, which is to be used on the spindle, is secured to this spindle head.

The cutter spindles are adapted to be driven from a motor 35 which is mounted on the top of the column 25. This motor may drive the cutter spindles through a drive such as shown in Fig. 11. Here, there is a spur pinion 36 connected to the armature shaft 37 of the motor, which meshes with a spur gear 38 that is secured to one end of a shaft 39. To the other end of this shaft is secured a spur gear 40. This gear meshes with a spur gear 41 that is secured to one end of a shaft 42. The shaft 42 has a bevel pinion 43 secured to its other end that meshes with a bevel gear 44. The bevel gear 44 may have a splined or other suitable sliding connection with a vertical shaft 45. The shaft 45 has a spur pinion 46 secured to its lower end which meshes with two spur gears 47 and 48 that are fastened, respectively, to the two cutter spindles 31 and 32. The two cutters are denoted at C and C', respectively, in Fig. 11.

The construction so far described is conventional, and has, therefore, not been illustrated in detail. The novel table drive of the present invention will now be described.

Figure 8:
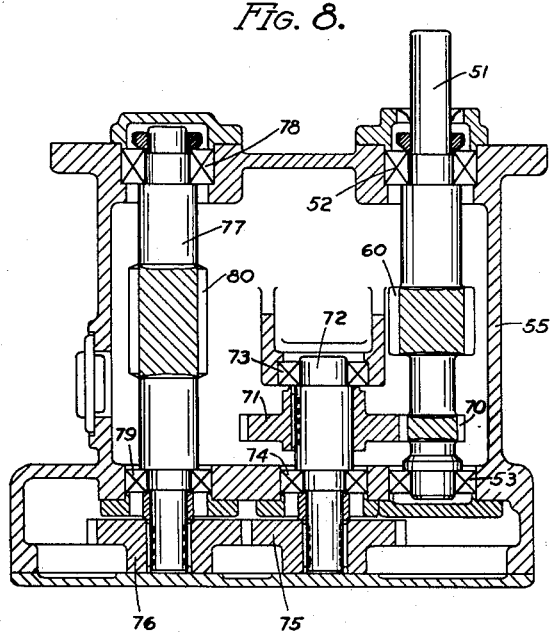
Fig. 8 is a sectional view on an enlarged scale, taken on the line 8—8 of Fig. 6, and showing details of the high and low speed drives.
Figure 9:
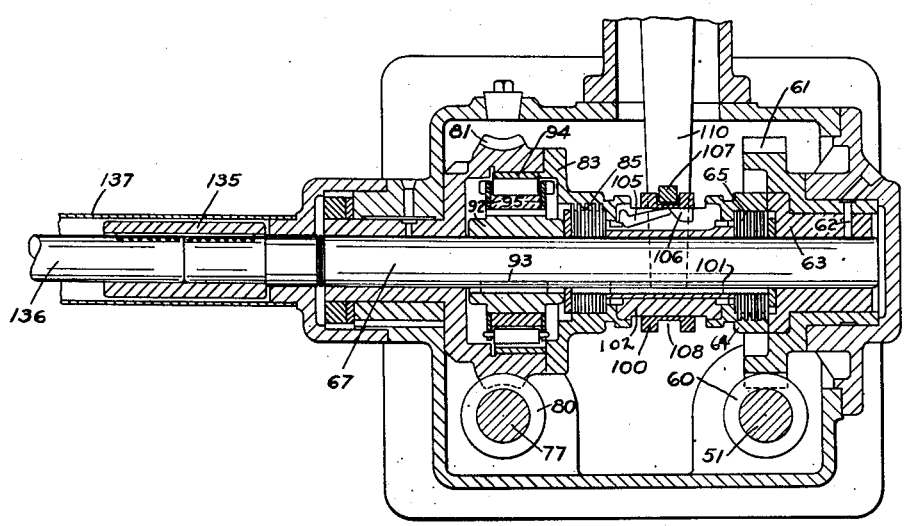
Fig. 9 is a sectional view on an enlarged scale, taken on the line 9—9 of Fig. 7 and showing further details of the high and low speed drives and of the shift mechanism therefor.

Mounted on the bed of the machine at a convenient point is a motor 50 (Fig. 11). The armature shaft 56 (Fig. 7) of this motor is connected through a suitable coupling 57 to a horizontal shaft 51 (Figs. 8 and 9). This shaft is journalled on suitable anti-friction bearings 52 and 53 in a gear box 55 that is secured in any suitable manner to one side of the bed 20 of the machine. The shaft 51 has a spiral gear or worm 60 integral with it that meshes at right angles with a spiral gear or worm wheel 61. The gear 61 has its hub secured by means of pins or dowels 62 to a sleeve 63. This sleeve member forms part of a standard, conventional type multiple disc clutch, which is denoted as a whole at 65. Alternate disc members of this clutch are keyed, respectively, to the shaft 67 and to the interior of a sleeve 64 which is fastened to sleeve 63. The shaft 67 is journalled at one end in the sleeve member 63. Thus, when the disc clutch 65 is engaged, the shaft 67 will be driven from the motor 50 through the reduction gears 60 and 61.

Secured to the shaft 51, or integral therewith is a spur pinion 70. This pinion meshes with a spur gear 71 (Figs. 8 and 11) which is keyed to a stub shaft 72 that is journalled in the gear box 55 on anti-friction bearings 73 and 74 in parallelism with the shaft 51. Keyed to one end of the shaft 72 is a spur gear 75. This meshes with another spur gear 76 that is keyed to one end of a shaft 77. This shaft is mounted in parallelism with the shafts 51 and 72 and is journalled in the box 55 on anti-friction bearings 78 and 79.

The shaft 77 has a worm or spiral pinion 80 secured to or integral with it. This gear meshes with a worm wheel or spiral gear 81. The worm wheel has a sleeve member 83 secured to it by screws (not shown) which engage in holes 84 (Fig. 10) in the worm wheel. This sleeve member forms part of another conventional type multiple disc clutch, like clutch 65, and designated as a whole at 85. Alternate disc members of clutch 85 are keyed to the shaft 67 and to the sleeve member 83, respectively. The shaft 67 is journalled at its left end (Fig. 9) in the hub of worm wheel 81.

The worm wheel also has a ring member 94 (Figs. 9 and 10) keyed to it. This ring member forms part of a standard type over-running clutch, which is denoted as a whole at 90 (Fig. 11). One type of over-running clutch, that may be employed, is illustrated in the drawings. In this clutch, there is a cam member 92 whose hub is keyed by key 93 to shaft 67. This cam member has a polygonal shaped periphery, having a plurality of flat surfaces designated 92'. Keyed to the hub of the cam member 92 are side-plates 95. Pivotally mounted on pins 96 on the side-plates 95 are spools 97. Mounted in each spool is a contact block 98. Loosely mounted between the inside surface of the ring 94 and the periphery of the cam member 92 are a plurality of rollers 9. Each block 98 is constantly urged toward engagement with a roller 99 by a coil spring (not shown) housed within the associated spool or housing 97. It will be seen, then, that when the worm wheel 81 is rotating and the cam 92 is otherwise stationary, the rotation of ring member 94, which is keyed to worm wheel 81, will cause the rollers 99 to be wedged between the ring member and the periphery of the cam 92, and thus the worm wheel will drive shaft 67. On the other hand, if the cam member 92 is being driven independently of the worm wheel 81, as is the case when shaft 67 is being driven through gearing 60—61, then rollers 99 will ride in the widest spaces between ring 94 and cam surfaces 92', and the clutch will over-run or idle.

The gearing 60—61 constitutes the high speed reduction for the work table drive. The gearing 70—71—75—76—80—81 constitutes the low speed reduction for the work table drive.

These two sets of reduction gearing are alternately connected to the shaft 67 through operation of a shiftable member 100 (Fig. 9), which is mounted to slide axially of shaft 67 on a sleeve 102. This sleeve is held by key 101 against rotation relative to shaft 67. When the member 100 is shifted to the right in Fig. 9, the disc clutch 65 is engaged so that the shaft 67 will be driven from the gears 60 and 61. When this member 100 is shifted to the left in Fig. 9, the disc clutch 85 is engaged so that the shaft 67 will be driven from the low speed drive 70, 71, 75, 76, 80 and 81.

The mechanism for engaging the several discs of either clutch frictionally with one another may be of any desired character. A well-known form of such mechanism is illustrated in the drawings where one of the levers for engaging the disc clutch 85 is denoted at 105. These levers are mounted in sleeve member 102 and are actuated by cam lugs 106 formed internally on sleeve member 100. A similar set of levers and corresponding lugs (not shown) are mounted in sleeve 102 to engage the other disc clutch 65.

The member 100 is adapted to be shifted axially of shaft 67 by a yoke member 107 (Figs. 9 and 7) which engages in a peripheral groove 108 that is formed in the sleeve 100. This yoke member is connected by pins 109 with the lower end of a shift lever 110. This lever is pivotally mounted upon a shaft 111 that is secured in a housing 112 which is bolted on the top of the gear box 55.

Worm wheel teeth 114 are provided (Figs. 6 and 7) on the upper end of the lever 110. A segmental worm member 115 meshes with the worm wheel teeth 114. This member is keyed to a shaft 116 which is journalled in the housing 112 and is axially slidable therein. This shaft is rotatably mounted at one end in a bracket 118 this is fastened to sliding base 21. The shaft 16 has an arm 120 (Fig. 3) secured to it which carries a roller 121 at its free end.

Mounted upon the periphery of the table 24 are a plurality of trip dogs 125 and 126. The trip dogs 125 alternate with the trip dogs 126 around the periphery of the table. Each of these trip dogs is secured to the periphery of the table by a T-bolt 127 which engages in the T-slot 128 formed on the periphery of the work table. Tongues 131 and 132, respectively, that are integral with the trip dogs, engage in the T-slot 128, to hold the dogs securely against pivotal movement.

The trip dogs 125, have inclined surfaces 129 that are adapted to engage the roller 121, during rotation of the table 24 in a clockwise direction as viewed in Fig. 3, to rock the lever arm 120 downwardly to cause the lever 110 to shift sleeve 100 (Fig. 9) in one direction. The trip dogs 126 have oppositely inclined surfaces 130 to cause the lever arm 120, to be rocked upwardly, to cause the sleeve 100 to be shifted axially in the other direction.

The shaft 67 is connected by a standard coupling 135 with the shaft 136 (Fig. 9). This shaft, which is enclosed in tubing 137, has sliding splined engagement with a pair of worms 138 and 139 (Fig. 11) which mesh, respectively, with worm wheels 140 and 141 (Fig. 1). These worm wheels are fastened to shafts 142 and 143, respectively, that are journalled in a bracket 145 which is secured to sliding base 21. These shafts have spur pinions 146 and 147, respectively, integral with them at their upper ends. These pinions mesh in spaced relation with a spur gear 150, which is bolted to the periphery of the table 24.

One use for the intermittent slow feed and high speed traverse drive of the present invention is illustrated diagrammatically in Fig. 12. Here there are shown mounted upon the work table 24 a plurality of work pieces W. Those shown are the exhaust manifolds of an automotive vehicle. The surfaces to be milled on these manifolds are the surfaces 155. It will be noted that the work pieces themselves are comparatively large whereas the surfaces 155 to be milled are comparatively small.

If the table 24 were to be driven at a uniform speed during the whole of the operation of the machine, the speed selected would have to be the slow speed required for feed of the surfaces 155 under the milling cutters C and C'. This would mean a great loss of time, since the machine would be running idle for most of a revolution. The high speed traverse of the present mechanism reduces the time-loss to a minimum. For a single spindle milling machine, the work table need only be run slow while the cutter is actually milling a surface 155; then its rotation can be speeded up until just before the cutter reaches the next surface to be milled. A two spindle machine may be operated in similar manner. The roughing cutter C' and finishing cutter C are close to one another, and when the roughing cutter has completed its cut, work will be in position for the finishing cutter C to commence its cut. When the finishing cutter has completed its cut, the rotation of the work table may be speeded up so as to bring the roughing cutter rapidly into engagement with the next surface 155 that is to be milled.

The operation of the intermittent slow feed and rapid traverse mechanism will be obvious from the preceding description, but may be summed up briefly here.

Assuming that the work has been properly chucked upon the work table and the work and cutters have been brought into proper relation, the motors 35 and 50 may be started. The motor 35 will drive the cutter spindles through the gearing 36, 38, 40, 41, 43, 44, 46, 47 and 48 illustrated diagrammatically in Fig. 11. The motor 50 will drive the worm wheels 61 and 81 simultaneously, the worm wheel 61 being driven through the worm or spiral gear 60, while the worm wheel 81 is driven through the gearing 70, 71, 75, 76, and 80. The shaft 67 and table 24 will then be driven either at slow speed or at high speed depending upon the position of sleeve 100.

Assuming that the sleeve 100 is in position where the disc clutch 65 is engaged, the shaft 67 will be driven at high speed through gears 60 and 61 and will drive the table at high speed for rapid traverse of the work. When one of the feed dogs 125 carried on the periphery of the table 24 comes into engagement with the roller 121 of lever arm 120, however, the surface 129 of this dog will force the lever arm downwardly to rock the shaft 116 clockwise as viewed in Fig. 7. This will cause the lever 110 to be rocked in such direction as to shift the sleeve 100 to the left as viewed in Fig. 9.

In the first part of this movement of the sleeve, the clutch 65 will be disengaged so that the shaft 67 will no longer be driven by gears 60 and 61. The momentum of the shaft 67 will continue, however, and will serve to drive the table on until clutch 85 is engaged. If, for any reason, however, the momentum of shaft 67 should fail to drive the table far enough to complete the leftward movement of the sleeve 100, the relative movement between the worm wheel 81 and the shaft 67 will cause the rollers 99 to be wedged between the ring 94 and the cam surfaces 92', and the shaft 67 will be driven from worm wheel 81 through ring 94, rollers 99, cam 92, key 93', and key 93. Ordinarily, however, the momentum of shaft 67 is such that it would drive the table 24 too far at high speed. The completion of the movement of the sleeve 100 to the left, by operation of the trip dog 125, however, will cause the disc clutch 85 to be engaged. This means that the shaft 67 will then be positively driven through worm 80 and worm wheel 81 and the disc clutch 85. Thus, the slow speed drive will in either case come into operation before the cutter engages a new work piece, and thus will prevent damage to the cutter.

The slow speed drive or feed will continue during the milling of a surface on a work piece. As soon as the milling has been completed, the dog 126, which is next to the dog 125 that has previously been in operation, will engage the roller 121 of lever arm 120 and rock shaft 116 counterclockwise as viewed in Fig. 7. This will cause the lever arm 110 to shift sleeve 100 back to the right as viewed in Fig. 9 and reengage the fast speed drive through clutch 65. Again, the over-running clutch 90 will insure that the shift of the lever 110 and sleeve 100 is completed, for the relative rotation between worm wheel 81 and shaft 67 will cause the ring member 94 to wedge the rollers 99 between ring member 94 and cam surfaces 92' of cam 92 and drive shaft 67 until high speed drive is resumed. This drive through the over-running clutch is very important at this stage, because unless some means were provided to insure continuation of the table drive until clutch 65 is re-engaged, the table might stop without member 100 having been shifted far enough to engage the high speed clutch. Thus, through use of the over-running clutch, completion of the shift of the sleeve 100 from low speed to high speed drive and vice versa is insured. Moreover, through use of this over-running clutch, all shock or noise at the time of shift from high speed to low speed drive or vice versa is avoided.

The elimination of shock, reduces to a minimum wear of the parts and maintenance costs. Moreover, the precise, positive engagement in either fast or slow movement allows full advantage to be taken of the rapid traverse, to drive the table as far as possible. Thus increased production is insured from the machine.

For set-up purposes, a hand lever 160 is secured to shaft 116. This permits of manual operation of shaft 116, and engagement at will of the slow speed or high speed drive. In this way, the rapid movement of the table is instantly available to the operator so that he can employ the same in setting up the machine.

While the invention has been described in connection with a vertical spindle type milling machine, it will be understood that it is not confined to this use. It may be employed on horizontal spindle rotary-drum type continuous milling machines, or on planer type, that is, straight-line milling machines, or on planers, or on other types of machine tools. It will be understood, also, that while particular forms of clutches have been illustrated and described in connection with the disclosure of the invention, any forms of clutches suitable for their purposes may be employed instead in place of clutches 65, 85 and 90. It will further be understood that while the invention has been described in connection with a particular embodiment thereof, it is capable of further modification, and that this application is intended to cover any adaptations, uses, or modifications of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described our invention, what we claim is:

1. The combination with a movable support, of means for moving the same comprising a rotary shaft, means operatively connecting said shaft to said support, a set of reduction gears for driving said shaft at high speed, a set of reduction gears for driving said shaft at low speed, means for driving both sets of reduction gears simultaneously and continuously, a clutch for connecting the first set of reduction gears to said shaft so as to drive said shaft through said first set of reduction gears, a second clutch for connecting the second set of reduction gears to said shaft so as to drive said shaft through the second set of reduction gears, a shiftable member for selectively engaging said clutches, and an overrunning clutch operatively disposed between the final member of said second set of reduction gears and said shaft and operable, when both the first and second clutches are disengaged, to connect said final member to said shaft to drive said shaft from said second set of reduction gears.

2. The combination with a movable support, of means for moving the same comprising a rotary shaft, means operatively connecting said shaft to said support, a set of reduction gears for driving said shaft at high speed, a set of reduction gears for driving said shaft at low speed, means for driving both sets of reduction gears simultaneously and continuously, a clutch for connecting the first set of reduction gears to said shaft so as to drive said shaft through said first set of reduction gears, a second clutch for connecting the second set of reduction gears to said shaft so as to drive said shaft through the second set of reduction gears, a shiftable member for selectively engaging said clutches, means carried by said support for shifting said shiftable member alternately in opposite directions, as said support moves, to engage alternately said first and second clutches, and an overrunning clutch operatively disposed between said shaft and the final member of said second set of reduction gears and operable, when both the first and second clutches are disengaged, to connect said final member to said shaft to drive said shaft through said second set of reduction gears.

3. The combination with a rotatable support, of means for driving the same comprising a rotary shaft, means operatively connecting said shaft to said support to rotate the support on rotation of said shaft, a set of reduction gears for driving said shaft at high speed, a set of reduction gears for driving said shaft at low speed in the same direction as said first set of reduction gears, a common means for driving both sets of reduction gears simultaneously and continuously, a clutch for connecting the first set of reduction gears to said shaft so as to drive said shaft through said first set of reduction gears, a second clutch for connecting the second set of reduction gears to said shaft so as to drive said shaft through the second set of reduction gears, a shiftable member for selectively engaging said clutches, means carried by said support for shifting said shiftable member alternately in opposite directions, as said support rotates, to engage alternately said first and second clutches, and an overrunning clutch operatively disposed between said shaft and the final member of said second set of reduction gears and operable, when both the first and second clutches are disengaged, to connect said final member to said shaft to drive said shaft through said second set of reduction gears.

4. The combination with a rotatable support, of means for driving the same comprising a rotary shaft, means operatively connecting said shaft to said support to rotate the support on rotation of said shaft, a set of reduction gears for driving said shaft at high speed, a set of reduction gears for driving said shaft at low speed in the same direction as said first set of reduction gears, a common means for driving both sets of reduction gears simultaneously and continuously, a clutch for connecting the first set of reduction gears to said shaft so as to drive said shaft through said first set of reduction gears, a second clutch for connecting the second set of reduction gears to said shaft so as to drive said shaft through the second set of reduction gears, a shiftable member for selectively engaging said clutches, trip members secured to said support in angularly-spaced relation about the axis of said support for shifting said shiftable member alternately in opposite directions, as said support rotates, to engage alternately said first and second clutches, and an over-running clutch disposed radially between said shaft and the final member of said second set of reduction gears and operable, when both the first and second clutches are disengaged, to connect said final member to said shaft to drive said shaft through said second set of reduction gears.

WORTHY J. F. FORWARD.
RONALD R. ROBERTS.

REFERENCES CITED

The following references are of record in the file of this patent:

UNITED STATES PATENTS

| Number | Name | Date |
| --- | --- | --- |
| 2,012,672 | Parsons | Aug. 27, 1935 |
| 2,156,698 | Martin | May 2, 1939 |
| 2,204,693 | Parsons | June 18, 1940 |
| 2,215,684 | Armitage | Sept. 24, 1940 |
| 2,259,489 | Renier | Oct. 21, 1941 |
| 2,370,222 | Bennett et al. | Feb. 27, 1945 |